United States Patent [19]
Ohmura

[11] Patent Number: 5,904,000
[45] Date of Patent: May 18, 1999

[54] REEL SEAT FOR USE ON FISHING RODS

[75] Inventor: Ryuichi Ohmura, Shizuoka, Japan

[73] Assignee: Fuji Kogyo Co., Ltd., Shizuoka-ken, Japan

[21] Appl. No.: 08/856,028

[22] Filed: May 14, 1997

[30] Foreign Application Priority Data

May 16, 1996 [JP] Japan .................................. 8-158785

[51] Int. Cl.⁶ .................................................. A01K 87/06
[52] U.S. Cl. ...................................................... 43/22
[58] Field of Search ..................................... 43/22

[56] References Cited

U.S. PATENT DOCUMENTS

| | | |
|---|---|---|
| 1,970,348 | 8/1934 | Turano . |
| 4,485,580 | 12/1984 | Ohmura . |
| 4,918,852 | 4/1990 | Yamato ...................................... 43/25 |
| 5,291,683 | 3/1994 | Yamato ...................................... 43/22 |
| 5,347,742 | 9/1994 | Ohmura ..................................... 43/22 |
| 5,606,819 | 3/1997 | Ozeki et al. ............................... 43/22 |
| 5,632,111 | 5/1997 | Takizawa ................................... 43/22 |

FOREIGN PATENT DOCUMENTS 58-41168  3/1983  Japan .
59-21662  6/1984  Japan .

*Primary Examiner*—Thomas Price
*Attorney, Agent, or Firm*—Evenson, McKeown, Edwards & Lenahan, P.L.L.C.

[57] ABSTRACT

A fishing rod reel seat comprises a cylindrical form of body having a central bore through which a blank rod is to be passed and provided with a reel seat surface by removing a portion of an outer periphery of said body, a fixed hood positioned so as to cover one end of said reel seat surface and including a reel leg receiving recess that is open toward the other end of said reel seat surface, and a substantially cylindrical form of movable hood fitted over the other end of said body such that it is axially movable thereover, with a second reel leg receiving recess located between said movable hood and said reel seat surface and being open toward said fixed hood. A portion of the outer periphery of said body in a circumferential direction is removed to define said reel seat surface, and at least said movable hood is provided in coaxial relation to said body, with a tapered outer surface thereof being of diameter diminishing toward said fixed hood.

9 Claims, 8 Drawing Sheets

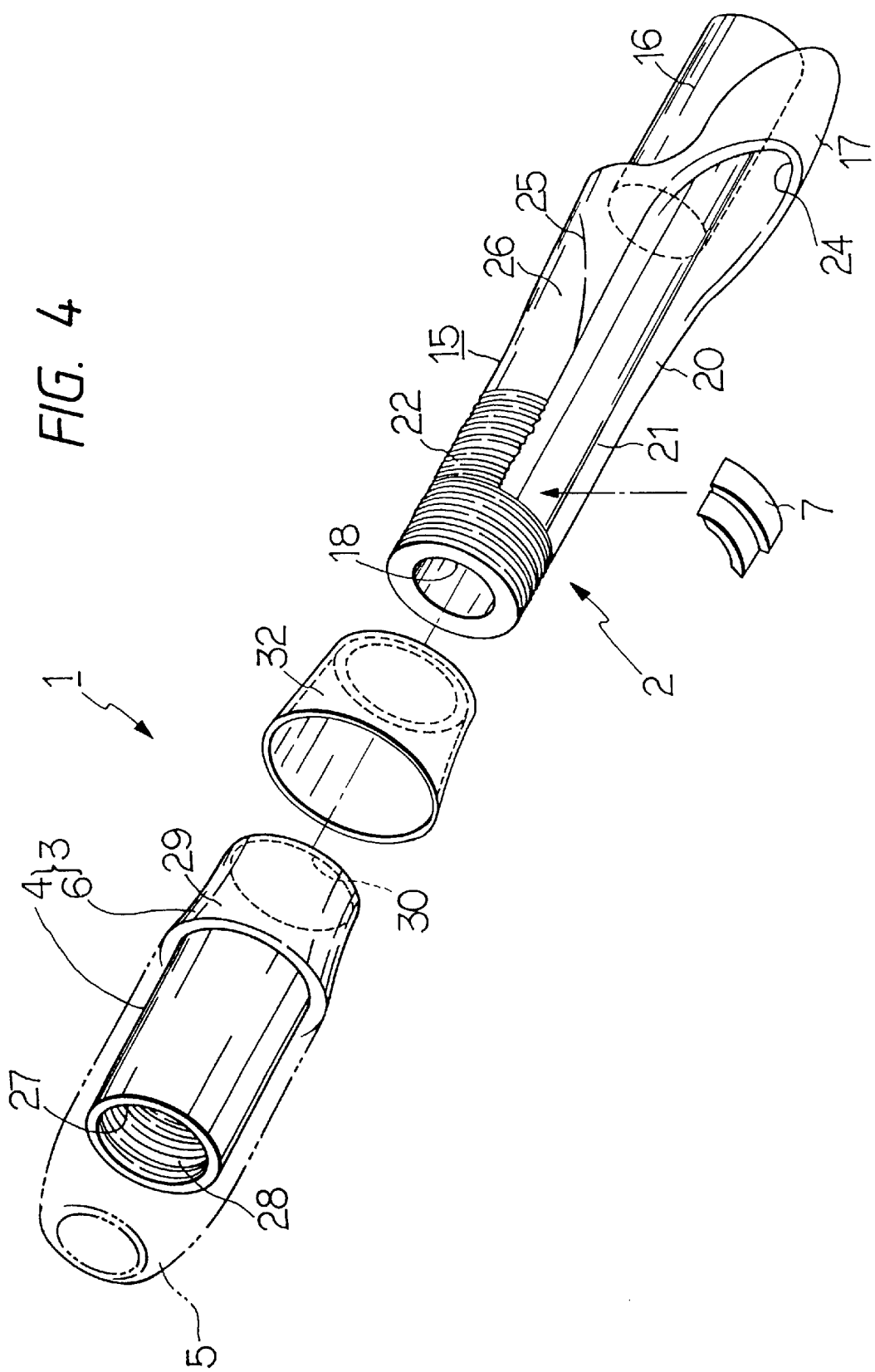

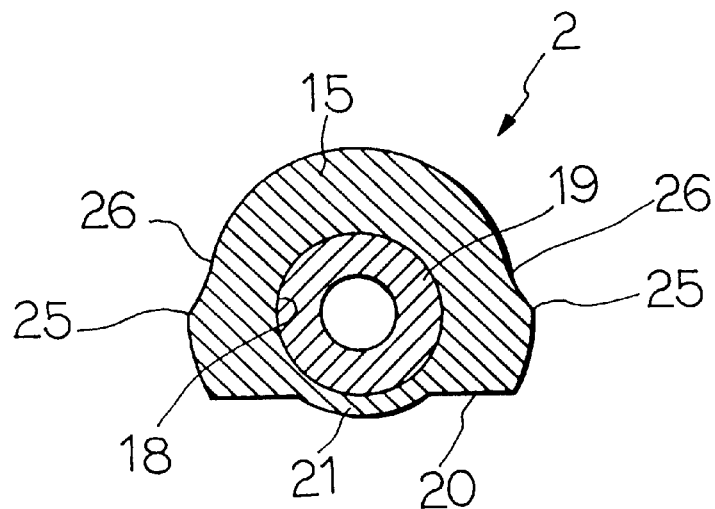
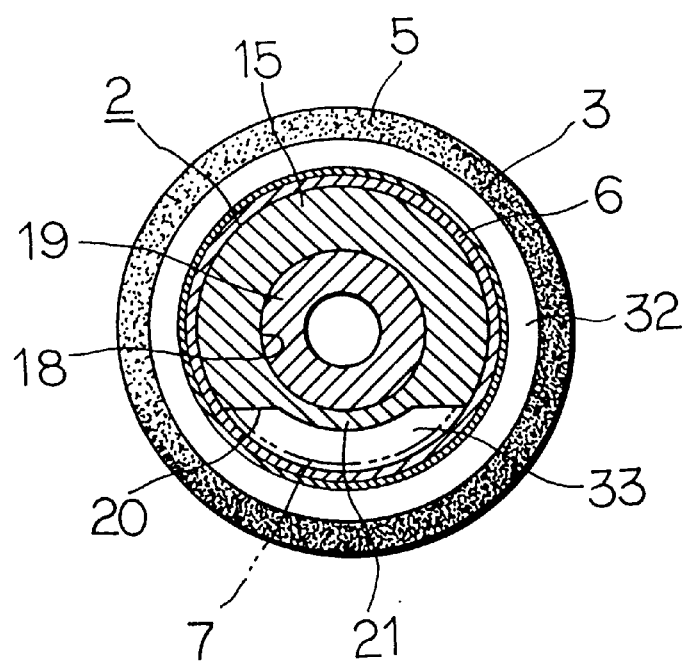

REEL SEAT FOR USE ON FISHING RODS

BACKGROUND OF THE INVENTION

1. Field of the Invention

The present invention relates generally to a reel seat for use on fishing rods, and more specifically to a fishing rod reel seat comprising a cylindrical form of body having a central bore through which a blank rod or a base member of a fishing rod is to be passed and a reel seat surface formed on a portion of an outer periphery of said body, a fixed hood located to cover one end of said reel seat surface and a substantially cylindrical form of movable hood fitted over the other end of said body so that it is axially movable thereover, with a reel leg held by said movable hood and said fixed hood.

2. Prior Art

A fishing rod reel seat is broken down into two types, one wherein a plate member is fastened to the outer surface of the blank rod, and the other wherein a pipe member is fitted over the flank.

Depicted in FIG. 9 is a typical pipe type of fishing rod reel seat a as set forth in Japanese Utility Model Laid-Open No. 58-41168.

In FIG. 9, small letter b represents a body of the reel seat a, which is in a substantially cylindrical form and has a central bore c through which the blank rod is to be inserted. A fixed hood d is fixedly fitted over one end of the body b. A movable hood e substantially symmetrical in shape with the fixed hood d is located in the vicinity of the other end of the body b and fitted over the body so that it is axially movable but not ratable. A nut f is in threaded engagement with an anterior end of the body b, and is rotatably coupled to the movable food e so that it is movable together with the movable food e in an axial direction alone.

Basically, these fixed and movable hoods d and e are each in a cylindrical form, and their circumferential portions are projected outwardly to define reel leg receiving recesses g and g which are open in opposite relation to each other.

The reel seat surface is defined by a zone h of the outer surface of the body b between the reel leg receiving recess g in the fixed hood d and the reel leg receiving recess g in the movable hood e. Letter i stands for mounting legs from the reel.

The attachment of the reel to the reel seat is done by engaging the endmost surface of the mounting leg i with the reel seat surface h of the body b, and inserting one end of the mounting leg i into the reel leg receiving recess g in the fixed hood d. Then, as shown by a two-dotted line in FIG. 9, the nut f is used to move the movable hood e toward the fixed hood d, thereby inserting the other end of the mounting leg i into the reel leg receiving recess g in the movable hood e, followed by clamping.

However, the aforesaid conventional reel seat a offers some problems upon gripped.

This reel seat a feels not a little sense of incompatibility to an individual who is gripping it, because the fingers or the palm are in close touch with the fixed hood d or the movable hood e. In particular, projecting sites with the reel leg receiving recesses formed therein do not only give a great sense of incompatibility to the individual but also render the gripping of the reel seat unstable, because such sites are gripped with the tips of the fingers via the reel seat surface h.

In the aforesaid reel seat a, the distance from the palm to the foremost end of the reel is defined by the total diameter of the body b plus the height of the reel, because the reel seat surface h on which the reel mounting legs i are mounted is in itself defined by the outer surface of the body b. Therefore, it is very difficult to perform thumbing upon cast because in many instances the index finger does not get to the spool.

With the aforesaid problems with the prior art in mind, it is an object of the invention to provide a fishing rod reel seat which is gripped in an invariably stable manner without any projection which may otherwise strike upon the hand of an individual who is gripping it and permits the external shape of hoods to act as a slip-proof means, and has an excellent aesthetic effect as well.

SUMMARY OF THE INVENTION

According to the present invention, the aforesaid object is achievable by the invention as defined in (1) to (5).

(1) A fishing rod reel seat comprising a cylindrical form of body having a central bore through which a blank rod is to be passed and provided with a reel seat surface on a portion of an outer periphery of said body, a fixed hood positioned so as to cover one end of said reel seat surface and including a reel leg receiving recess that is open toward the other end of said reel seat surface, and a substantially cylindrical form of movable hood fitted over the other end of said body such that it is axially movable thereover, with a second reel leg receiving recess located between said movable hood and said reel seat surface and being open toward said fixed hood, wherein:

a portion of the outer periphery of said body in a circumferential direction is removed to define said reel seat surface, and at least said movable hood is provided in coaxial relation to said body, with a tapered outer surface thereof being of diameter diminishing toward said fixed hood.

(2) The fishing rod reel seat of the above (1), wherein an outer surface of said fixed hood is in a tapered form of diameter diminishing toward said movable hood.

(3) The fishing rod reel seat of the above (1) or (2), wherein at least a portion of said body that opposes to said reel seat surface except a range of movement of said movable hood is shaped such that it goes away from an axis of said fishing rod reel seat in a posterior direction.

(4) The fishing rod reel seat of the above (1), (2) or (3), wherein finger concave portions are formed on right and left sides of the outer surface of said body, and each of ridge-lines of said finger concave portions extends from the vicinity of a posterior end of said body to the vicinity of a side edge of an intermediate portion of said reel seat surface, presenting a generally arched curve with an apex directed toward said reel seat surface.

(5) The fishing rod reel seat of the above (1), wherein a posterior end of said body is provided with a finger lever.

BRIEF DESCRIPTION OF THE DRAWINGS

FIG. 4 is an exploded perspective view showing the spinning seat shown in FIG. 1.

FIG. 5 is an enlarged end view taken along the line V—V in FIG. 3.

FIG. 6 is an enlarged sectional view taken along the line VI—VI in FIG. 3.

DETAILED DESCRIPTION OF PREFERRED EMBODIMENTS OF THE INVENTION

Figure 1:
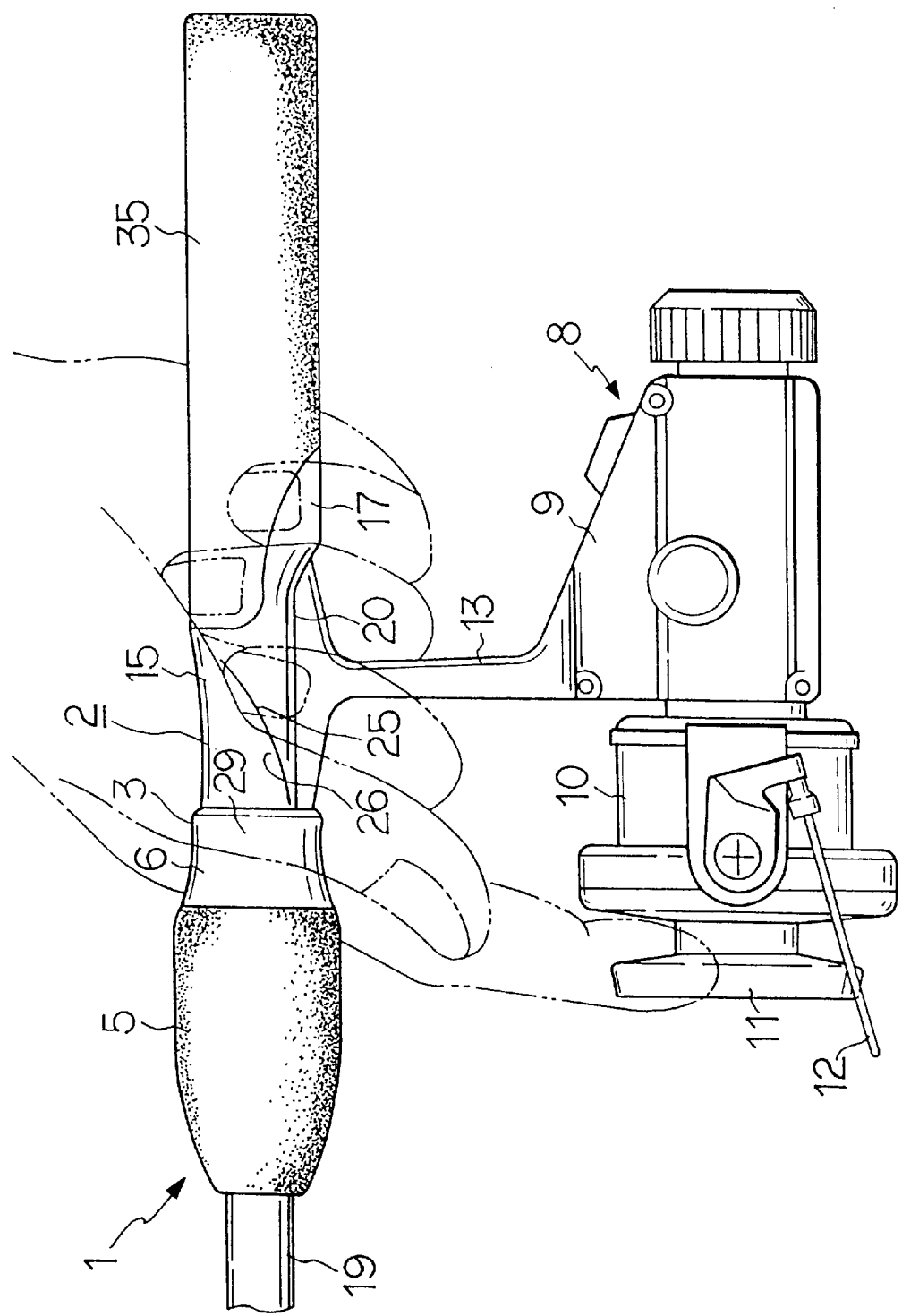
FIG. 1 is a side view of a first embodiment of the invention wherein the fishing rod reel seat according to the invention is applied as a spinning seat on which a spinning reel is mounted.

Reference will now be made to FIGS. 1 to 6 which illustrates one embodiment of the fishing rod reel seat or, shortly, the spinning seat according to the present invention.

Reference numeral 1 represents generally a spinning seat comprising a body 2, a movable hood 3 in threaded engagement with the body 2, a nut cover 5 attached to a nut portion 4 of the movable hood 3, and a piece 7 located within a hood portion of the movable hood 3 (that will hereinafter be called the movable hood portion). The body 2, movable hood 3, and piece 7 are all formed of hard plastic resin.

Reference numeral 8 stands for one example of a spinning reel assembly comprising a casing 9 having a gear mechanism and so on therein, a rotor 10, a spool 11, bail 12, a mounting leg 13, etc. The mounting leg 13 takes a substantially T-shaped configuration as viewed laterally, and is to be detachably inserted at both upper anterior and posterior ends 14 and 14 through the movable hood portion 6 and a fixed hood portion (as will be described later) of the spinning seat 1.

The body 2 comprises a main portion 15, a grip engaging portion 16 extending from a posterior end of the main portion 15, and a fixed hood portion 17 for receiving one of the two inserting ends 14 and 14 of the mounting leg 13 of the spinning real, all being integrated into one piece. In this regard, it is herein noted that the anterior and posterior directions are defined as the left-hand and right-hand directions in FIG. 1, respectively.

The main portion 15 is fundamentally in a cylindrical form with a posterior one-third or so of the posterior end side having a tapered shape of diameter increasing slightly in the posterior direction. The main portion 15 has a central bore 18 that is in a circular cross-section shape, and has an inner diameter such that a blank 19 or a base of a fishing rod is closely inserted therethrough.

Reference numeral 20 indicates a surface of the body 2 on which the reel is to be seated. The reel seat surface 20 is made flat by removing a circumferentially lower end of a peripheral portion of the body 2, and has a width somewhat smaller than an outer diameter of the body 2. Thus, the reel seat surface 20 extends along the full length of the body 2 except its anterior end, and along an anterior half of the grip engaging portion 16.

It is noted that at a widthwise intermediate portion of the reel seat surface 20 there is extended a projection 21 provided when forming the central bore 18 by machining, said projection 21 being arched in cross-section.

An outer surface of an anterior one-third or so of the anterior end side of the body 2 is externally threaded (an externally threaded part 22); however, that outer surface is not externally threaded (the externally threaded part 22) at a location corresponding to the reel seat surface 20.

The grip engaging portion 16 is in a cylindrical form having an outer diameter somewhat larger than the diameter of the central bore 18 through the body 2, and extends from the posterior end of the body 2 in coaxial relation to the central bore 18, so that the central bore 18 through the body 2 is contiguous to a central bore 23 through the grip engaging portion 16.

The fixed hood portion 17 is a concave member open at the front, and is positioned in such a manner that it covers the anterior end of the reel seat surface 20. Specifically, the fixed hood portion 17 is in a substantially bow form as viewed from above, with a narrow rearmost portion, and in an arched profile as viewed from the front, which is defined by extending the outer periphery of the posterior end of the body 2. At an anterior half of the fixed hood portion 17, there is provided a recess 24 that is open in the anterior direction to receive the reel seat surface 20 so that it is associated with the posterior end of the reel seat surface 20. An open edge of the fixed hood portion 17 is canted so that it is forwardly displaceable as it comes nearer to the reel seat surface 20.

Figure 3:
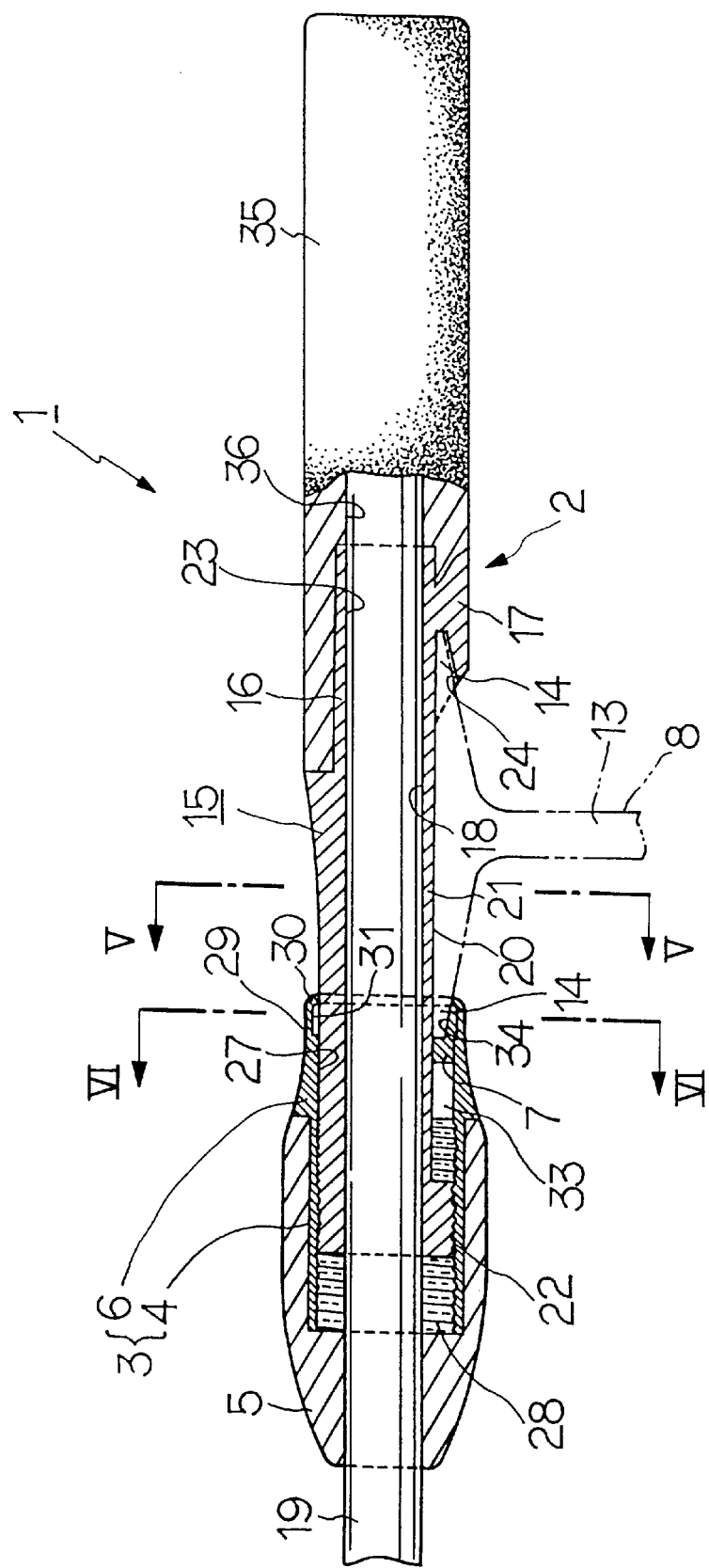
FIG. 3 is a sectional view taken along the line III—III in FIG. 2.

It is noted that the aforesaid recess 24 is of rearwardly decreasing width, as can be seen from FIG. 3.

Reference numeral 25 represents ridgelines (only one of which is shown) defined on the right and left sides of the outer periphery of the body 2. Each ridgeline 25 extends from the vicinity of the posterior end of the body 2 to the vicinity of an intermediate side edge of the reel seat surface 20 in the anterior-posterior direction, presenting a generally yet gently arched curve with an apex directed toward the reel seat surface. As can be seen from FIG. 5, some area 26 of the outer surface of the body 2 extending upwardly along the line 25 is suitably dented with respect to the rest (hereinafter referred to as the finger concave portions).

The movable hood 3 is in a generally cylindrical form, and comprises a posterior or movable hood portion 6 and an anterior or nut portion 4. A bore 27 through the movable hood 3 has a diameter substantially equal to the outer diameter of the anterior end of the body 2, and is internally threaded at 28 over a range commensurate with the nut portion 6.

The movable hood portion 6 has a length that is about one-fourth of the full length of the body 2, and has a truncated cone shape of contour. That is, an outer surface 29 of the movable hood portion 6 is of rearwardly decreasing diameter, and presents a centripetally yet gently concaved surface. A posterior end of the movable hood portion 6 has an outer diameter slightly larger than the outer diameter of the body 2, with a posterior open edge 30 being bent in the form of a centripetally extending flange. The movable hood portion 6 has then an outer diameter at its anterior end that is somewhat larger than the outer diameter of the nut portion 4.

Referring to FIG. 3, reference numeral 31 indicates a shallow groove provided in an inner surface of the bore 27 and located near to its posterior end to receive the piece 7 as mentioned above.

Referring here to FIGS. 4 and 6, reference numeral 32 stands for a hood cap (shown only in FIGS. 4 and 6) formed of a thin metal plate, which is to be fitted closely over the movable hood portion 6. The hood cap 32 gives protecting, and aesthetic effects on the movable hood portion 6.

The nut portion 4 of the movable hood 3 is of relatively small thickness, and is fitted thereover with a nut cover 5. The nut cover 5 is in a substantially cylindrical form, and is formed of material that is smooth to the touch and has rubber-like elasticity. A portion of the nut cover 5 except its anterior end is then inserted all over the nut portion 4 for bonding thereto. In this state, the outer surface of the nut cover 5 is contiguous with that of the movable hood portion 6 with no step between them, as can be seen from FIGS. 1 and 3.

Referring now to FIG. 3, the movable hood 3 is threadedly engaged at the nut portion 4 with the anterior end of the body 2 so that it is movable over the body 2. In turn, this allows the movable hood portion 6 to be in opposition to the fixed hood portion 17.

Once the movable hood 3 has been joined to the body 2, there is defined a space 33 between the movable hood portion 6 and the reel seat surface 20. As can be seen from FIG. 6, this space 33 is substantially arched in cross-section.

The aforesaid piece 7 is received and located in the space 33 as mentioned just above. The piece 7 is a piece arched in the anterior-posterior direction as shown in FIG. 4, which is fitted closely into a posterior end of the space 33 while an anterior portion thereof is engaged within the aforesaid groove 31 formed in the movable hood portion 6.

At the posterior end of the space 33, a reel leg receiving recess 34 is thus defined by the piece 7 and the reel seat surface 20 in opposite relation to the reel leg receiving recess 24 in the fixed hood portion 17. Such two reel leg receiving recesses 34 and 24 are almost similar in size but symmetrical in shape to each other.

Referring again to FIG. 1, reference numeral 35 represents a grip formed of material that has rubber-like elasticity, and is in a generally cylindrical form, with its posterior end being closed up while its anterior end is in a form having complementary relation to the posterior end of the body 2. The grip 35 has a length almost equal to that of the body 2 and an outer diameter almost equal to that of the posterior end of the body 2, and has a central bore 36 having a diameter such that the blank 19 can be somewhat forcibly inserted therethrough.

A portion of the blank 19 that extends from the body 2 in the posterior direction is press-fitted into the central hole 36 through the grip 35, and an anterior end of the grip 35 is fitted over the posterior end of the body 2, thereby defining a gripper for the blank 19 together with the body 2.

In this state, it is noted that the outer surface of the body 2 is contiguous with that of the grip 35 with no step between them.

The spinning seat 1 constructed as mentioned above is in a generally slender tabor form as viewed laterally, and presents a smoothly curved outer surface with no noticeable steps, apart from the reel seat surface 20. This is chiefly because the external shape of the movable hood portion 6 is in a tapered form of diameter that diminishes toward the fixed hood portion 17. In other words, the outer surface 29 of the movable hood portion 6 is contiguous with that of the nut cover 5 with no step between them. Further, the outer surface 29 of the movable hood portion 6 is in a tapered form of rearwardly diminishing diameter, and is contiguous with the outer surface of the body 2 with a slight step between them, and the outer surface of the body 2 is then smoothly contiguous with the outer surface of the grip 35 with no step between them.

The spinning reel 8 is attached to the spinning seat 1 as follows. First, the nut portion 4 is moderately threaded back to move the movable hood 3 forward, thereby making a space between the reel leg receiving recess 34 in the movable hood portion 6 and the reel leg receiving recess 24 in the fixed hood portion 17. Then, the posterior end 14 is inserted into the reel leg receiving recess 24 in the fixed hood portion 17, followed by threaded rearward movement of the movable hood 3. This causes the anterior end 14 to be inserted into the reel leg receiving recess 34 in the movable hood portion 3 and the upper end portion of the mounting leg 13 to be pressed against the reel seat surface 20, so that the spinning reel 8 can be attached to the spinning seat 1.

Figure 2:
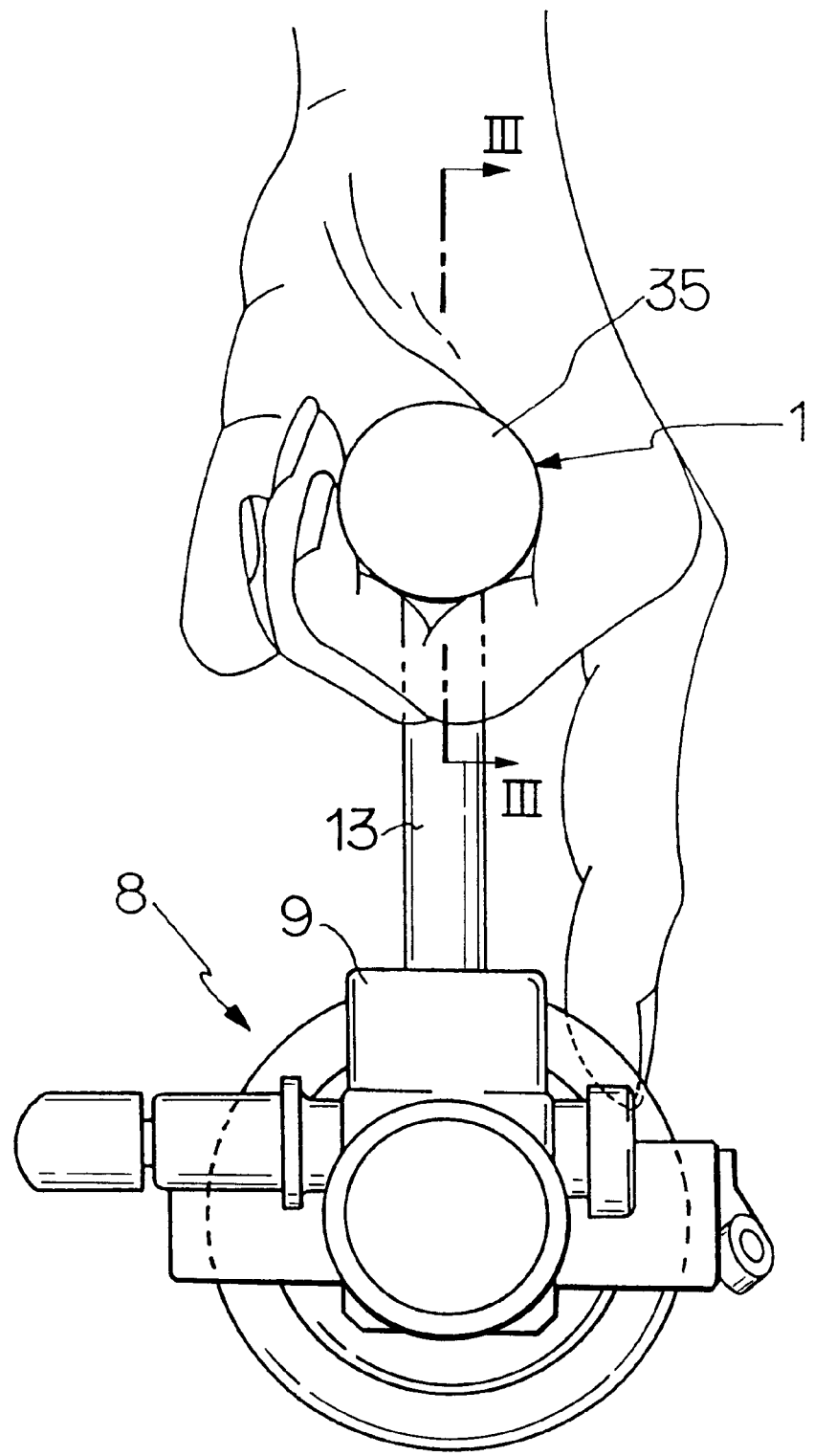
FIG. 2 is a rear view of the embodiment of FIG. 1 as viewed from behind.

Shown in FIGS. 1 and 2 is a general style of how to grip a fishing rod with the spinning reel 8 mounted on it after it has been cast. Typically, one grips the spinning seat 1 with the mounting leg 13 of the spinning reel 8 put between the roots of the middle and medical fingers. In this condition, a substantially middle portion of the palm comes in contact with an upper portion of the outer surface of the body 2 while a site between the thumb and the index finger comes into contact with the outer surface 29 of the movable hood portion 6. In other words, one can grip the spinning seat 1 in much the same manner as one holds a tabor in place.

Thus, the tapered outer surface 29 of the movable hood portion 6 presents a slip-proof surface for the hand, and so ensures to grip the reel seat 1 in a stable manner and to prevent such an obstruction as often experienced with a conventional reel seat with projections from being presented to the hand or the roots of the thumb and the index finger. In addition, an upper and posterior region of the outer surface of the body 2 is bent in a gently curved path, and so presents no obstruction to the site of the wrist.

Thus, it is possible to grip the spinning seat 1 in a stable manner while no sense of incompatibility is felt to the palm of the hand.

Use of such spinning seat 1 enables an individual to manipulate the reel 8 and perform thumbing in particular in a reasonable manner. That is, since one can grip the spinning seat 1 in much the same manner as one holds a tabor in place, the root of the index finger is positioned slightly nearer to the axial center of the body 2 than to the outer surface of the grip 35 or nut cover 5. In addition, the reel seat surface 20 is positioned slightly nearer to the axial center of the body 2 than the basic outer surface of the body 2. With the spinning seat of the invention, the reel is nearer to a hand than with a conventional reel seat, so that the spool such as one shown at 11 can lie sufficiently within reach of the tip of the index finger, as can be seen from FIGS. 1 and 2.

Figure 7:
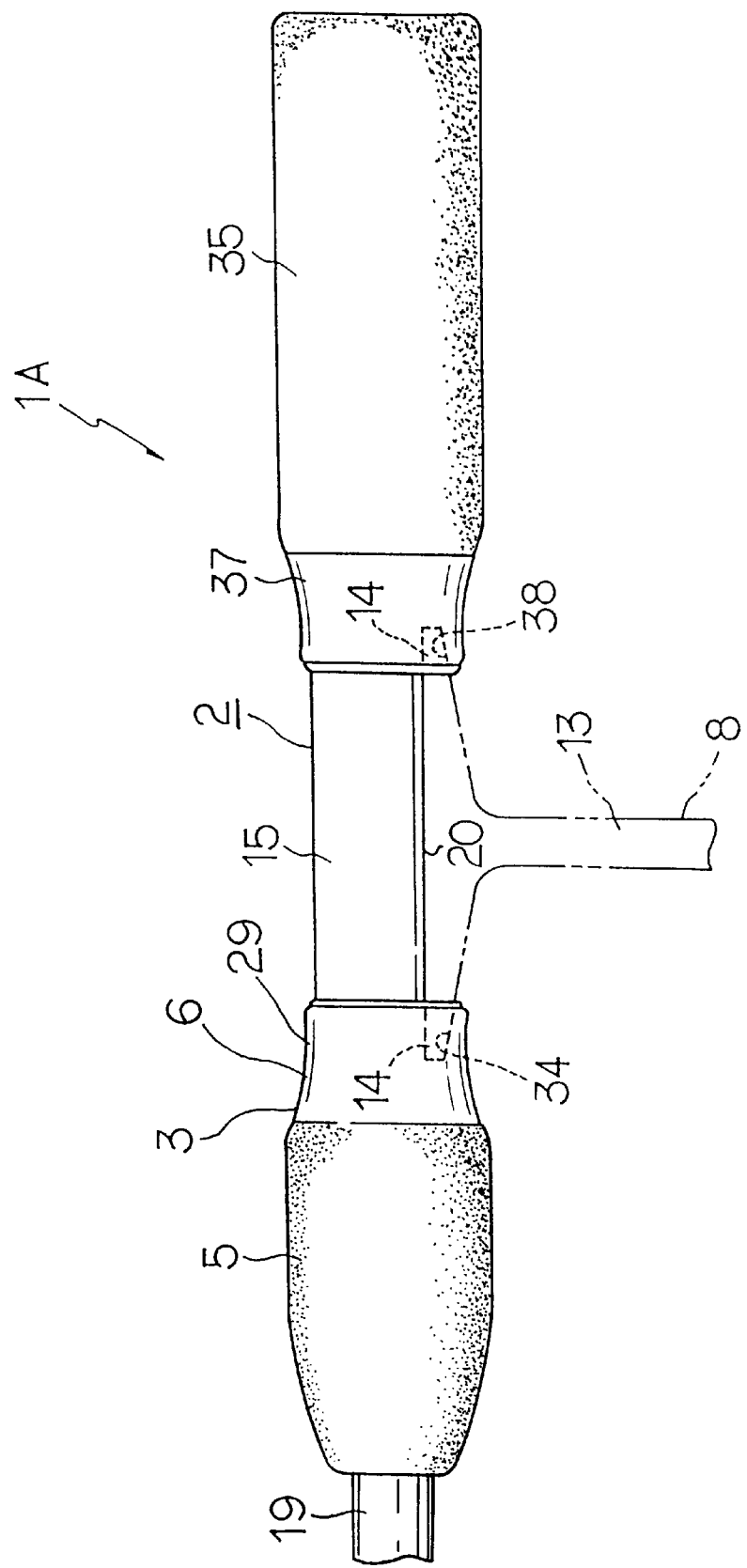
FIG. 7 is a side view showing a second embodiment of the invention wherein the fishing rod reel seat of the invention is applied as a spinning seat.

FIG. 7 shows a second embodiment 1A of the fishing rod reel seat of the invention which is used in the form of a spinning seat.

The spinning seat shown generally at 1A is similar to the aforesaid spinning seat 1 only with the exception that the external shape of a movable hood portion 6 is also applied to a fixed hood portion, as will be explained just below. Like parts are indicated by like numerals in FIG. 1, and so will be not explained.

Reference numeral 37 represents a fixed hood portion that defines a posterior end of a body 2. The external shape of the fixed hood portion 37 is inversely symmetric with the movable hood portion 6 in the anterior-posterior direction. In a location corresponding to a reel seat surface 20, there is provided a reel leg receiving recess 38 that is open in the anterior direction.

While ends 14 and 14 from a mounting leg 13 of a spinning reel 8 are separately inserted into the reel leg receiving recess 38 and a reel leg receiving recess 24 in the movable hood portion 6, a movable hood 3 is clamped to mount the spinning reel 8 on the spinning seat 1A.

The spinning seat 1A, too, is in a slender tabor form as viewed laterally, presenting a smooth or, noticeably unobstructed, curved surface except areas opposing the reel seat surface 20.

It is noted that the fixed hood portion 37 may be provided in the form of an independent part which, in turn, is joined to the body 2.

Figure 8:
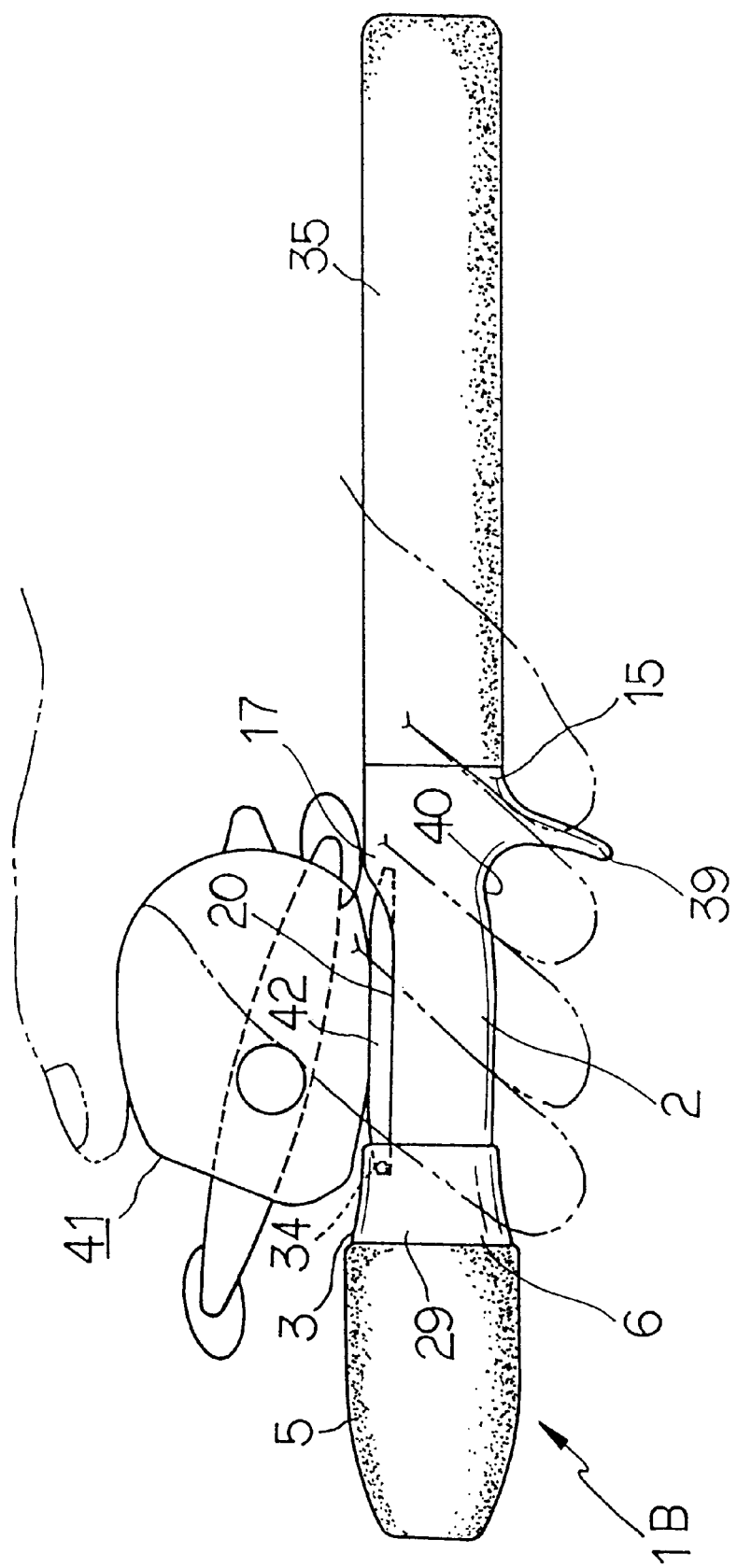
FIG. 8 is a side view of a third embodiment of the invention wherein the fishing rod reel seat of the invention is applied as a bait casting seat.
Figure 9:
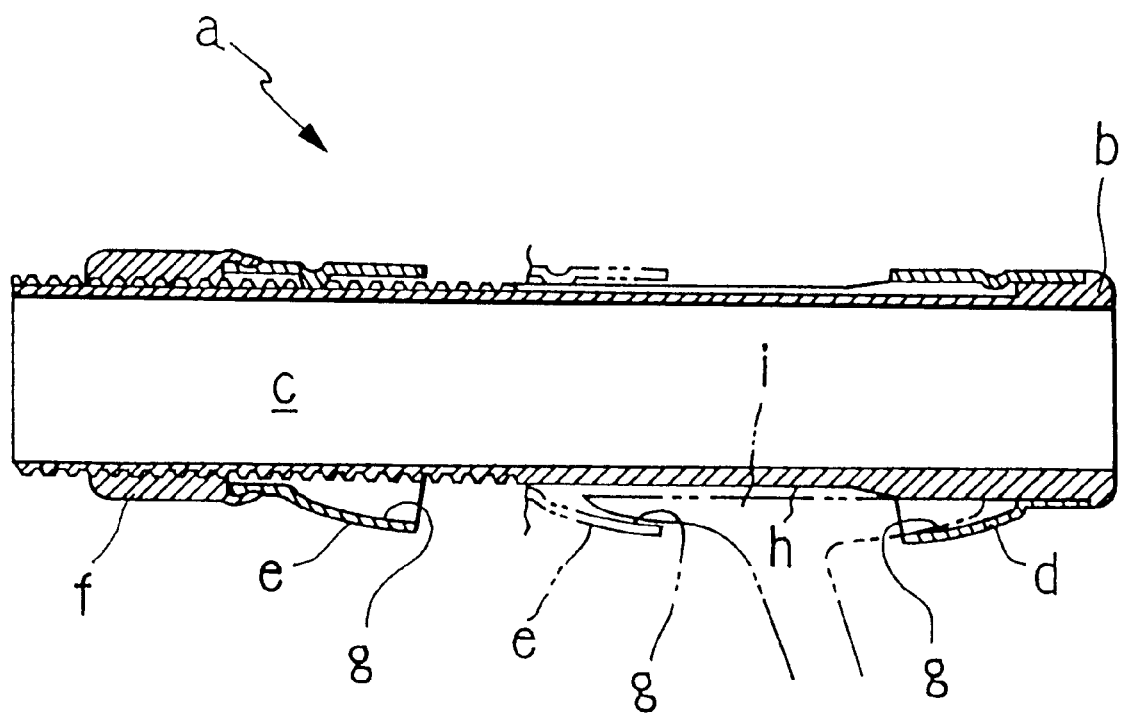
FIG. 9 is a longitudinally sectioned view of a conventional pipe type of fishing rod reel seat.

FIG. 8 illustrates a third embodiment 1B of the fishing rod reel seat of the invention which is applied to a fishing rod reel seat preferably used with a bait casting reel (hereinafter called the bait casting seat).

A large difference between this bait casting seat 1B and the aforesaid spinning seat 1 is only the provision of a finger lever.

The finger lever indicated at 39 is an integral part of a body 2, which projects from a position of a posterior end of an outer surface thereof that opposes to a reel seat surface 20. In the position of the outer surface of the body 2 that opposes to the reel seat surface 20, a substantially concave space 40 is thus delineated at both ends by a tapered slope of a movable hood portion 6 and the finger lever 39.

A bait casting reel 41 includes a mounting leg 42 which is separately inserted at both anterior and posterior ends into a reel leg receiving recess 24 in a fixed hood portion 17 and a reel leg receiving recess 34 in a movable hood 3.

Referring generally to how to grip the bait casting seat 1B during the reeling of a fishing line, the thumb of one hand is positioned around an upper portion of a casing of the bait casting reel 41, with the reel seat surface 20 turned upward, as shown by a two-dotted line. In this state, the bait casting seat 1B is gripped with all the remaining fingers with the aforesaid lever 39 put between the fourth and fifth fingers. Then, a handle is manipulated with another hand.

While the bait casting seat is gripped in this way, high stability is obtained because the second, third and fourth fingers are well fitted into the aforesaid concave form of space 40.

In this state, the tip of the index finger is in smooth contact with a tapered outer surface 29 of the movable hood portion 6 which also acts as a slip-proof surface.

It is envisioned that the present invention is subject to many modifications while the present invention has been described at great length with reference to the aforesaid specific embodiments. Accordingly, it is intended that the present invention not be limited to the particular embodiments illustrated herein, but embraces all such modified forms thereof as come within the scope of the present invention.

For instance, the anterior-posterior relation between the fixed and movable hoods may be contrary to that illustrated above.

While the movable hood and nut have been described as being formed as an integral body, it is understood that they may be provided as independent parts which, in turn, may be used as such or as an integral body.

It is further noted that the type of the reel seat to which the present invention can be applied is not limited to the name "spinning seat" or "bait casting seat" used herein.

From the foregoing, the advantages of the present invention will be apparent to those skilled in the art. The fishing rod reel seat of claim 1 can be used with no sense of incompatibility caused by the presence of a projection as found in a conventional reel seat, because a site between the thumb and the index finger of the hand that takes a firm hold of it is in touch with the tapered outer surface of the movable hood. In addition, the tapered outer surface of the movable hood acts as a slip-proof means for the hand, ensures that the reel seat can be gripped in a greatly stable manner.

The reel seat surface is located nearer, to some extent, to the axis of the body than to the basic outer surface of the body, and so it is possible to perform thumbing in a reasonable manner because the tip of the index finger can lie within reach of the spool of the reel.

The fishing rod reel seat of claim 2 can be gripped in a more stable manner because the outer surfaces of both the movable and fixed hoods are in a tapered form of diameter diminishing in the opposite directions; they are in a slender tabor as viewed laterally.

The fishing rod reel seat of claim 3 can be gripped in a much more stable manner, and enables the tips of a finger to get easily at the reel, because the whole of at least an apex of a portion in touch with the palm of the hand taking a firm hold of the reel seat from its side opposite to the reel seat surface is dented toward the reel seat surface, and not a little portion of the palm is in touch with the thus dent-shaped portion.

The fishing rod reel seat of claim 4 can be gripped in a much more stable manner, because a site of the hand taking a grip of the reel seat that lies at the finger concave portion is subject to slip-proof action at an area along the ridgelines.

The fishing rod reel seat of claim 5 is best suited for use as a bait casting type of fishing rod reel seat. Upon gripped, the reel seat achieves high stability because most of the fingers are received in the concave space delineated at both ends by the tapered slope of the movable hood and the finger lever.

Upon this reel seat gripped, the tapered outer surface of the movable hood acts as a slip-proof means because the tip or so of the index finger is in touch with that tapered outer surface.

What is claimed is:

1. A fishing rod reel seat comprising a cylindrical form of body having a central bore through which a blank rod is to be passed and provided with a reel seat surface on a portion of an outer periphery of said body, a fixed hood positioned so as to cover one end of said reel seat surface and including a reel leg receiving recess that is open toward the other end of said reel seat surface, and a substantially cylindrical form of movable hood fitted over the other end of said body such that it is axially movable thereover, with a second reel leg receiving recess located between said movable hood and said reel seat surface and being open toward said fixed hood, wherein:

a portion of the outer periphery of said body in a circumferential direction is removed to define said reel seat surface, and at least said movable hood is provided in coaxial relation to said body, with a tapered outer surface thereof being of diameter diminishing toward said fixed hood.

2. The fishing rod reel seat of claim 1, wherein an outer surface of said fixed hood is in a tapered form of diameter diminishing toward said movable hood.

3. The fishing rod reel seat of claim 2, wherein at least a portion of said body that opposes to said reel seat surface except a range of movement of said movable hood is shaped such that it goes away from an axis of said fishing rod reel seat in a posterior direction.

4. The fishing rod reel seat of claim 2, wherein finger concave portions are formed on right and left sides of the outer surface of said body, and each of ridge-lines of said finger concave portions extends from the vicinity of a posterior end of said body to the vicinity of a side edge of an intermediate portion of said reel seat surface, presenting a generally arched curve with an apex directed toward said reel seat surface.

5. The fishing rod reel seat of claim 1, wherein at least a portion of said body that opposes to said reel seat surface except a range of movement of said movable hood is shaped such that it goes away from an axis of said fishing rod reel seat in a posterior direction.

6. The fishing rod reel seat of claim 5, wherein finger concave portions are formed on right and left sides of the outer surface of said body, and each of ridge-lines of said finger concave portions extends from the vicinity of a posterior end of said body to the vicinity of a side edge of an intermediate portion of said reel seat surface, presenting a generally arched curve with an apex directed toward said reel seat surface.

7. The fishing rod reel seat of claim 1, wherein finger concave portions are formed on right and left sides of the outer surface of said body, and each of ridge-lines of said finger concave portions extends from the vicinity of a posterior end of said body to the vicinity of a side edge of an intermediate portion of said reel seat surface, presenting a generally arched curve with an apex directed toward said reel seat surface.

8. The fishing rod reel seat of claim 1, wherein a posterior end of said body is provided with a finger lever.

9. In combination, a fishing rod and a reel seat as defined in claim 1.

* * * * *